No. 816,251. PATENTED MAR. 27, 1906.
F. PETMECKY.
COMBINED MINNOW BUCKET AND TRAP.
APPLICATION FILED SEPT. 27, 1905.
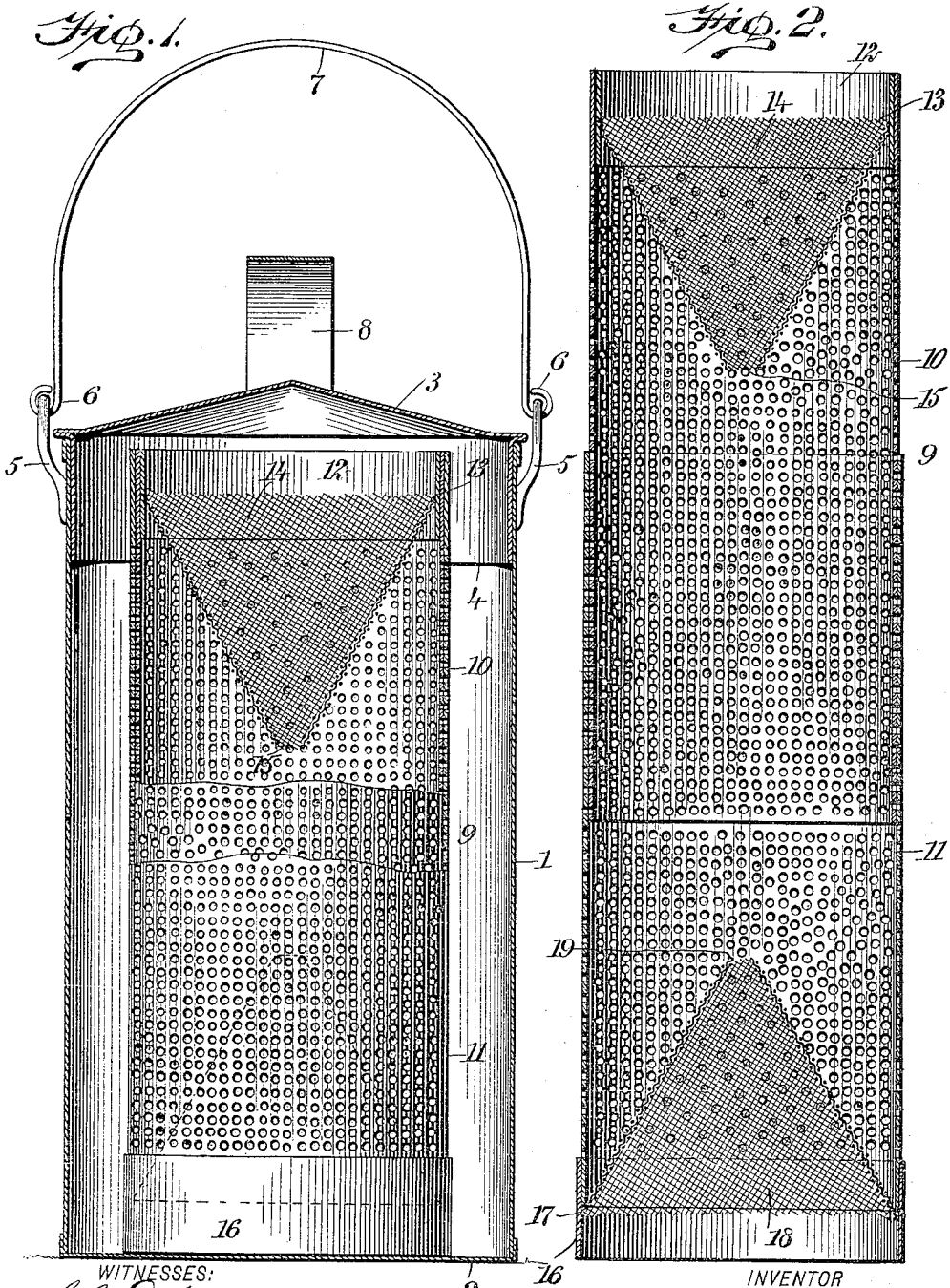
WITNESSES:
H. G. Dieterich
E. E. Ellis
INVENTOR
Fred Petmecky
BY
Munn
ATTORNEYS

UNITED STATES PATENT OFFICE.

FRED PETMECKY, OF AUSTIN, TEXAS.

COMBINED MINNOW BUCKET AND TRAP.

No. 816,251.  Specification of Letters Patent.  Patented March 27, 1906.

Application filed September 27, 1905. Serial No. 280,310.

*To all whom it may concern:*

Be it known that I, FRED PETMECKY, a citizen of the United States, and a resident of Austin, in the county of Travis and State of Texas, have invented a new and Improved Combined Minnow Bucket and Trap, of which the following is a full, clear, and exact description.

This invention relates to combined minnow buckets and traps; and it consists, substantially, in the details of construction and combinations of parts hereinafter more particularly described, and pointed out in the claims.

One of the principal objects of the invention is to provide a combined minnow bucket and trap of an embodiment to overcome numerous disadvantages and objections frequently encountered in other contrivances of the kind hitherto devised.

A further object is to provide a device of this kind which is simple in construction and comparatively inexpensive to manufacture, besides being thoroughly effective and reliable for its purposes and possessing the capacity for long and repeated service.

The above and additional objects are attained by means substantially such as are illustrated in the accompanying drawings, in which—

Figure 1 is a vertical sectional view of a combined minnow bucket and trap embodying my improvements, the sections of the inner member or trap-bucket being shown as adjusted to practically the minimum of the capacity thereof; and Fig. 2 is a similar view of the trap-bucket alone, showing its construction more clearly and indicating the manner in which the working capacity thereof may be varied at will.

Before proceeding with a more detailed description it may be stated that in the form of my improvements herein shown I employ an outer member or bucket of ordinary or well-known form, together with an inner member or bucket having specially-constructed heads applied to the ends thereof, making of this bucket a trap for the minnows. Said inner member or trap-bucket is also of special construction, by which the working capacity thereof may be varied, as may be desired in use, and while I have herein represented my improvements in a certain preferred embodiment it will be understood, of course, that I am not limited thereto in precise detail, since immaterial changes therein may be resorted to coming within the scope of my invention.

Reference being had to the drawings by the designating characters thereon, 1 represents an outer member or bucket of my improved structure, the same being provided with a closed bottom 2 and provided at the upper open end thereof with a lid or cover 3 of any preferred form, preferably comprising a ring 4, closely fitting within the upper part of said outer member or bucket, as shown. The latter is provided at diametrically opposite sides thereof near its upper edge with suitably-constructed ears 5, to which are loosely connected at 6 the ends of an ordinary bail 7, by which the structure may be lifted and carried about. The said lid or cover 3 may, if desired, be provided with a suitable handle 8 for enabling the same to be readily applied to and removed from the said mentioned outer member or bucket 1.

Located within the outer member or bucket 1 is an inner member or bucket 9 of smaller diameter, the same being adapted to rest upon said bottom 2 of the outer member or bucket, as shown. This inner member or bucket is constituted of two or more tubular sections 10 and 11, constructed of open-work, as foraminated or reticulated material, preferably the former, as shown, the said tubular section 10 working telescopically within the said tubular section 11, by which the height or working capacity of the said inner member or bucket 9 may be increased or otherwise varied at will in a manner quite apparent and as indicated in Fig. 2, for instance, wherein the tubular section 10 is withdrawn from the tubular section 11 for an appreciable extent of the length thereof. The lower end of the said tubular section 10 is open, and the upper end thereof is provided with a head constructed, preferably, of an inner close-fitting ring 12, to the inner surface of which is secured in any suitable way the edge 13 of the base of an inverted hollow cone 14 of open-work, as foraminated or reticulated material, preferably the latter, the apex of said hollow cone being open at 15 to permit of the entrance of the minnows within the tubular sections 10 and 11 of the inner member or bucket whenever the latter is placed within a body of water for that purpose. The upper end of the said tubular section 11 of the inner member or bucket 9 is open, and the lower end thereof is provided, preferably, with an outer close-fitting ring 16, serving in part as a base for the support of the inner structure on the bottom 2 of the outer structure. Secured to the inner surface of this ring 16 in any suitable manner is the edge 17 of the base of a hollow cone 18, the apex of which is open within the tubular section 11, as indicated at 19, and is disposed in the direction of the apex 15 of the inverted hollow cone 14 at the upper end of the tubular section 10. This cone 18 is also constructed of open-work, as foraminated or reticulated material, preferably the latter, and it is apparent that the dimensions of the two cones are such as that sufficient clearance is provided between the apices thereof to prevent the contact of one with the other in the closed position of the telescopic tubular sections 10 and 11.

From the foregoing it will be seen that in virtue of the association with the tubular sections 10 and 11 of the inner member or bucket the latter also constitutes a trap for the minnows, as will be understood. This trap may be placed within a body or stream of water in the usual manner with devices of this kind either by standing the same on one of its ends or by placing it lengthwise, as may be desired, a suitable bait being placed therein for the purpose of attracting the minnows, the latter entering through one or the other of the hollow cones or both, according to the position of the trap. Either the ring 12 may be detachable from the upper end of the tubular section 10 of the trap and the ring 18 permanently secured to the lower end of the tubular section 11, or vice versa, or both the said rings may be detachable, accordingly as may be desired in practice, thus to facilitate access to the trap without necessarily disconnecting the said tubular sections, of which the same is mainly comprised.

Having thus described my invention, I claim as new and desire to secure by Letters Patent—

1. A combined minnow bucket and trap, comprising an outer bucket, and an inner trap-bucket consisting of tubular sections of open-work, each section being provided at one end with a hollow conical head of open-work, the apices of the heads being open and disposed toward each other within said trap-bucket, one of said tubular sections fitting telescopically within the other section to permit of varying the height or working capacity of the said inner bucket.

2. A combined minnow bucket and trap, comprising an outer bucket, and an inner bucket consisting of tubular telescopic sections of foraminated material, the sections being each provided at one end thereof with a hollow conical head of open-work, the apices of the heads being open and disposed toward each other.

3. A minnow-trap comprising tubular sections of open-work, fitting each other telescopically to permit of varying the capacity of the trap, each section being provided at one end with a hollow conical head of open-work located within the section, the apices of the heads being open and disposed toward each other.

4. A combined minnow bucket and trap, comprising an outer bucket and an inner trap-bucket of tubular telescopic sections of open-work, an end of each of said sections being provided with a hollow conical head of open-work, the apex of which is open and disposed within the section.

5. A minnow-trap, comprising tubular telescopic sections of open-work, the upper end of one section and the lower end of the other section each being provided with a hollow conical head of open-work, one or both of said heads being detachable, and the apex of each head being open and located within the section to which it belongs.

In testimony whereof I have signed my name to this specification in the presence of two subscribing witnesses.

FRED PETMECKY.

Witnesses:
J. C. PETMECKY,
CHAS. PETMECKY.